United States Patent Office 3,504,564
Patented Apr. 7, 1970

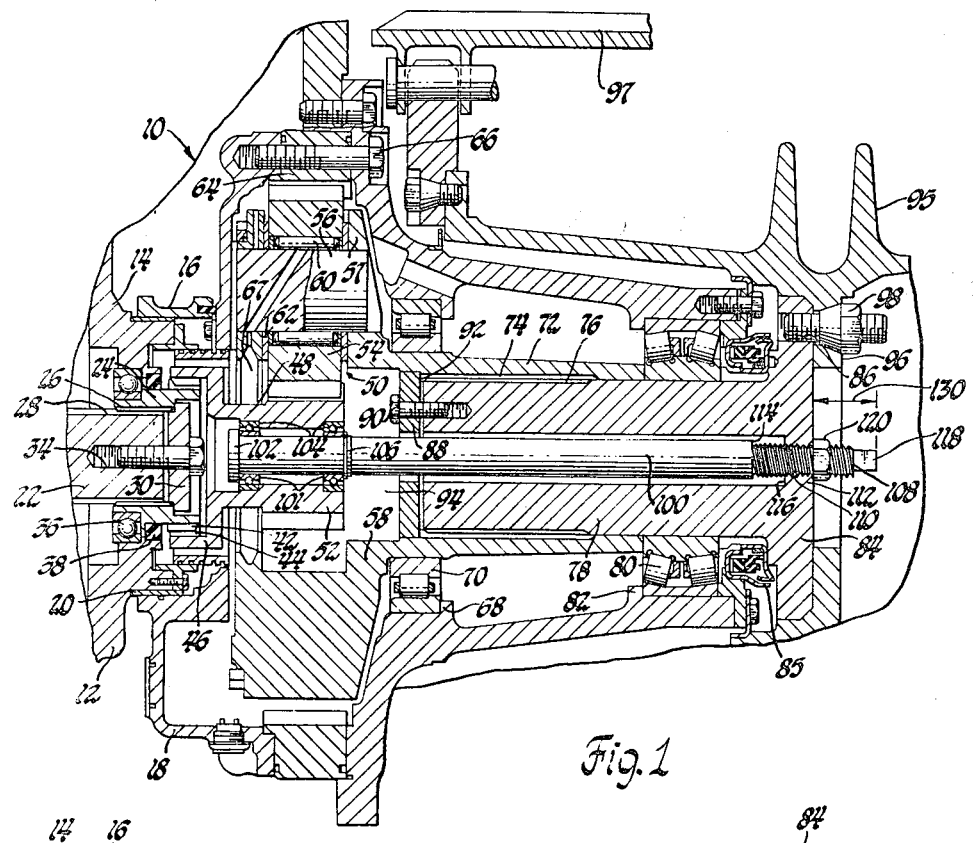

3,504,564
EXTERNAL FINAL DRIVE DISCONNECT
Nathaniel B. Kell, Indianapolis, Ind., assignor to General Motors Corporation, Detroit, Mich., a corporation of Delaware
Filed Oct. 2, 1968, Ser. No. 764,405
Int. Cl. F16h 35/00; F16d 11/10
U.S. Cl. 74—405
7 Claims

ABSTRACT OF THE DISCLOSURE

The final transmission drive shown has a planetary reduction gear assembly and an externally accessible disconnect device for use on a vehicle to disconnect the drives between the transmission output and the final drive input, permitting field preparation of the vehicle for towing. The final drive assembly includes threaded means accessible at the hub of the usual drive wheel for axially rotatably moving a central bolt shaft and slidably moving the sun gear and the internally splined final drive input shaft to a new position such that the latter shaft is completely disconnected from an externally splined coupling member which is rotated by the axle or cross-drive transmission output shaft, while the sun gear remains in mesh with the planet pinions.

---

This invention relates generally to vehicular final drive assemblies and more particularly to an improved assembly including a disconnect feature which provides ready external access thereto.

It is desirable in most vehicular power trains to provide means for attaining access to the final drive assembly, in the event of a failure of the power package, in order to quickly and easily prepare the vehicle for towing (1) without motoring the transmission, and (2) without having to remove heavy access plates and performing very tedious and laborious work in a cramped power package compartment to disengage the drive line.

Accordingly, a primary object of the invention is to provide a new and improved final drive assembly embodying the above desirable disconnect features.

Another object of the invention is to provide such a final drive assembly which is simple in construction, economical to manufacture and highly efficient in operation.

A further object of the invention is to provide such a final drive assembly which includes threaded means accessible at the hub of the usual drive wheel for axially rotatably moving the central bolt or quill shaft and slidably moving the sun gear and the splined final drive input shaft to a new position such that the latter shaft is completely disconnected from a splined coupling member which is rotated by the axle or cross-drive transmission output shaft, while the sun gear remains in mesh with the planet pinions.

Other objects and advantages of the invention will become more apparent when reference is made to the following specification and accompanying drawings wherein:

FIGURE 1 is a fragmentary cross-sectional view of a final drive assembly embodying the invention; and FIGURE 2 is an enlarged fragmentary cross-sectional view of the final drive assembly illustrated in FIGURE 1 showing portions thereof in a disconnected position in accordance with the invention.

Referring now to the drawings in greater detail, FIGURE 1 illustrates a final transmission drive assembly 10 wherein there is partially shown at 12 one output side of a cross-drive transmission including an end portion 14 of the transmission case. The end portion 14 extends into a semicylindrical transmission support saddle 16 of the final drive assembly 10 which is, in turn, supported through its housing 18 in a vehicle by any suitable fastening means (not shown). A sleeve 20 is shrunk fit on the cylindrical end portion of the housing member 14, providing a wear-resistant mounting surface for the transmission. The end portion 14 of the transmission case is hollow and houses a driving member or cross-drive transmission output shaft 22 provided with a coupling member 24. The member 24 is secured to the output shaft 22 by internal splines 26, which mesh with external splines 28 formed adjacent the end of the output shaft 22 to prevent relative rotational movement therebetween, and is retained from longitudinal movement thereon by a retainer or plate 30 and a bolt 32. The bolt 32 extends through the plate 30 and threads into a threaded opening 34 formed in the end of the output shaft 22.

A suitable annular antifriction bearing 36 rotatably supports the coupling member 24 and the end of the output shaft 22 in the end portion 14 of the transmission case. Also, an annular fluid seal 38, located between the outer periphery of the coupling member 24 and the interior of the end portion 14 of the transmission case, is provided to seal the transmission from the final drive assembly 10. The coupling member 24 is formed with a head portion 40 having external splines 42 formed thereon which are adapted to mesh with internal splines 44 formed in a hollow end portion 46 of a final drive input shaft 48. These splines have their leading edges tapered to facilitate engagement during connecting movement. The other end of the input shaft 48 extends into the final drive planetary gear system 50 which will now be described.

An integral sun gear 52 is formed on the end of the input shaft 48 opposite the splined end portion 46. The sun gear 52 meshes with a plurality of gears or planet pinions 54, only one of which is shown, whose spindles 56 are confined within the front portion 57 of a support structure 58 of the final drive assembly 10 which provides a rotatable carrier for the planet pinions 54. Roller bearings 60 rotatably support the planet pinions 54 on their spindles 56 and are retained in operating position by annular spacers 62. The planet pinions 54 mesh with a stationary ring gear 64 which may be secured between front and rear portions of the final drive assembly housing 18 by bolts 66. An axial space or cavity 67 remains between the end portion 46 of the input shaft 48 and the planet pinions 54 for a purpose to be described.

As shown, the housing 18 includes a seat 68 for a bearing 70. The bearing 70 rotatably supports one end of the carrier 58, the rear portion of which forms an output sleeve shaft 72. The sleeve shaft 72 includes internal splines 74 which mesh with external splines 76 formed on a driven member or final drive assembly output shaft 78, the final drive input shaft 48 drives the sun gear 52, the sun gear 52 drives the planet pinions 54 which react on the grounded ring gear 64 to drive the carrier 58 and the output sleeve shaft 72, serving as a speed reducing-torque increasing drive or connecting means between the driving member 22 and the driven member 78. The output shaft 78 extends through the sleeve shaft 72 and is supported beyond the end of the sleeve shaft 72 by a bearing 80 which is mounted on a seat 82 formed in the housing 18. The shaft 78 terminates in an external cylindrical output flange 84. A suitable seal 85 is confined between the bearing 80 and the back face of the flange 84. A plurality of threaded openings 86 are formed adjacent the outer periphery of the output flange 84. The shaft 78 is held in axial alignment by means of an end plate 88 which is secured to the inboard end thereof by bolts 90. The plate 88 abuts against a step 92 formed within the sleeve shaft 72. A space or cavity 94 remains between the plate 88 and the sun gear 52 for a purpose to be described.

A sprocket assembly 95 driving a track 97, or other suitable ground propulsion means, includes an internal flange 96 which is mounted against the output flange 84 and secured thereto by means of studs and nuts, or bolts 98, threaded into the openings 86.

A central bolt or quill shaft 100 extends through the output shaft 78 and the sun gear 52, supported with the latter on a pair of bearings 101 mounted near the ends of the sun gear 52. A flange 102 is formed on the inboard end of the shaft 100 and abuts against one bearing 101 in a step 104 formed within the input shaft 48 on one side of the sun gear 52. A removable collar or snap ring 106 is fixed on the quill shaft 100 adjacent the other face of the sun gear 52 to engage the other bearing 101. The sun gear is thus mounted for rotation relative to and axial movement with the quill shaft 100.

At the outboard end, the quill shaft 100 includes a threaded extension 108 which meshes with threads 110 formed on an internal collar 112 of the output shaft 78. A step 114 formed at the juncture of the extension 108 and the body of the quill shaft 100 abuts in the disconnected position against the inner surface 116 of the collar 112. A smooth and/or shaped end portion 118 is formed at the terminal end of the threaded extension 108 to provide means for manually rotating the extension 108 with respect to the internal collar 112 to effectuate axial movement between connected and disconnected positions. A lock nut 120, or other suitable fastener, is threaded onto the threaded extension 108 against the flange 84 of the output shaft 78 to lock the quill shaft 100 in either the engaged or disengaged position.

When it becomes necessary to prepare the vehicle for towing, the following operations are performed.

First, the nut 120 is loosened and a suitable tool, a wrench, such as a lug wrench or other control mechanism (not shown), is applied to the shaped or smooth end portion 118 of shaft 110 to manually rotate the threaded extension 108 with respect to the threaded collar 112 to effect rightward movement of the shaft 100.

The rightward movement of shaft 100 will move the axially attached sun gear 52 to the right to the disengaged position as in FIGURE 2, the quill shaft 100 rotating within the sun gear 52 on the bearings 101, and the flange 102 pulling against the left side of the sun gear 52 through the left bearing 101, thereby slidably disengaging the internal splines 44 associated with the sun gear 52 from the external splines 42 formed on the coupling member 24. Once the step 114 formed on the quill shaft 100 abuts against the inner surface 116 of the collar 112, the final disengaged position of the final drive input shaft 48 is reached, and the sun gear 52 will have attained the position within the spaces 67 and 94, respectively, as illustrated in FIGURE 2. It may be further noted that the sun gear 52 and the planet pinions 54 remain in mesh and the quill shaft 100 remains rotatably supported by the bearings 101 in both positions. Should residual torque load tend to prevent the sliding of the splines 44 out of mesh with the splines 42, the vehicle may be nudged one way or the other until the coupling is free of load.

Lastly, the nut 120 is once again tightened against the flange 84 to lock the quill shaft 100, and the vehicle is ready for towing without having to motor the transmission, as a result of the positive disconnect arrangement just described.

When it is desired to once again connect the drive line, the process is reversed, i.e., the nut 120 is loosened, a suitable tool is applied to the smooth or shaped end 118 to manually rotate the threaded extension 108 with respect to the threaded collar 112 to effect leftward movement to a dimension 130 which denotes proper drive engagement.

The sun gear 52, being axially fixed to the quill shaft 100, will be moved to the left, reestablishing full length mesh with the pinion gears 54, and the splines 44 will be meshed with the coupling member splines 42 for engaged drive as in FIGURE 1. The nut 120 is then retightened against the flange 84 to lock shaft 100. Since the sun gear 52 remains in partial mesh with the pinions in the disconnect position, maintaining radial support of sun gear 52, and the mating ends of splines 42 and 44 are tapered, movement to the connect position is facilitated.

It should be apparent that the invention provides a quick and easy access to the final drive assembly in order to prepare the vehicle for towing without motoring the transmission or having to remove heavy access plates and performing very tedious and laborious work in a cramped power package compartment to disengage the cross-drive transmission output from the final drive input.

While but one embodiment of the invention has been disclosed and described, it is apparent that other modifications of the invention are possible.

I claim:

1. A final drive assembly for a vehicle, said assembly comprising a driving member driven by a transmission, a final drive input shaft, spline means for interconnecting said driving member and said input shaft in a connecting position and disconnecting said driving member and said input shaft in a disconnecting position, a sun gear rotatable by and fixed for movement with said input shaft, planet gears meshing with said sun gear, a ring gear element meshing with said planet gears, said planet gears being rotatably mounted on a carrier element, an output shaft connected to one of said elements, means operatively connected to hold the other of said elements for driving said one element, ground propulsion means operatively connected to said output shaft and driven thereby, a quill shaft mounted through central openings in said output shaft means and said input shaft and rotatably supported on a bearing mounted in said central opening of said input shaft, and threaded means operatively connected to said output shaft means and said quill shaft for simultaneously slidably axially moving said input shaft from said connecting position to said disconnecting position and rotatably moving said quill shaft for slidably disconnecting said spline means interconnecting said driving member and said input shaft.

2. The assembly described in claim 1, including, additionally, confining means associated with said quill shaft on both faces of said sun gear.

3. The assembly described in claim 2, wherein said confining means consists of flanges formed on said quill shaft adjacent said faces of said sun gear.

4. The assembly described in claim 1, wherein said output shaft includes a threaded opening at one end thereof and said quill shaft includes a threaded extension formed on the outboard end thereof, said threaded extension being threadedly mounted in said threaded end portion of said output shaft.

5. The assembly described in claim 4, including, additionally, fastening means operatively connected to said threaded extension against the end face of said output shaft for holding said quill shaft in position relative to said output shaft.

6. The assembly described in claim 4, wherein a shaped end portion is formed on the terminal end of said threaded extension for manually actuated rotation of said quill shaft when said fastening means is disconnected from said end face of said output shaft.

7. A final drive assembly for a vehicle, said assembly comprising a driving member driven by a transmission, a final drive input shaft, spline means for interconnecting said driving member and said input shaft in a connecting position and disconnecting said driving member and said input shaft in a disconnecting position, a sun gear rotatable by and fixed for movement with said input shaft, planet gears meshing with said sun gear, a ring gear element meshing with said planet gears, said planet gears being rotatably mounted on a carrier element, a hollow output shaft connected to one of said elements, means operatively connected to hold the other of said elements for driving said one element, ground propulsion means operatively connected to said output shaft means and driven thereby, a threaded opening formed in the outboard end of said output shaft means, a quill shaft rotatably supported at its inboard end on a bearing mounted in said input shaft and having a threaded extension formed on its outboard end threadedly mounted in said threaded opening of said output shaft means, a flange formed on said quill shaft adjacent each face of said sun gear, said threaded extension including means for manually turning said threaded extension for simultaneously slidably axially moving said input shaft from said connecting position to said disconnecting position and rotatably moving said quill shaft on said bearing to slidably disconnect said spline means interconnecting said driving member and said input shaft, said sun gear sliding axially relative to said planet gears and remaining partially in mesh therewith.

References Cited

UNITED STATES PATENTS 3,387,502   6/1968   LeTourneau _____ 74—391

LEONARD H. GERIN, Primary Examiner

U.S. Cl. X.R.

74—391; 192—67